United States Patent [19]

Dammers et al.

[11] Patent Number: 4,843,273

[45] Date of Patent: Jun. 27, 1989

[54] HEATER MECHANISM WITH THERMOELECTRIC POWER GENERATOR

[75] Inventors: Helmut Dammers; Dieter Dammers, both of Düsseldorf, Fed. Rep. of Germany

[73] Assignee: Thermo-Watt Stromerzeugungsanlagen GmbH, Düsseldorf, Fed. Rep. of Germany

[21] Appl. No.: 191,216

[22] Filed: May 6, 1988

[30] Foreign Application Priority Data

May 12, 1987 [DE] Fed. Rep. of Germany ... 8706762[U]
May 12, 1987 [DE] Fed. Rep. of Germany ... 8706763[U]

[51] Int. Cl.$^4$ .................. F24H 3/02; F28D 21/00; H01L 35/30
[52] U.S. Cl. .................. 310/306; 126/110 B; 219/202; 237/12.3 A
[58] Field of Search .......... 126/110 B, 110 D; 219/202; 237/12.3 A; 310/306; 322/2 R

[56] References Cited

U.S. PATENT DOCUMENTS 3,719,532  3/1973  Falkenberg et al. .......... 310/306
4,753,682  6/1988  Cantoni .................. 322/2 B

FOREIGN PATENT DOCUMENTS 3148162  6/1983  Fed. Rep. of Germany ...... 310/306
60-35968  2/1985  Japan ...................... 310/306

*Primary Examiner*—Patrick R. Salce
*Assistant Examiner*—D. L. Rebsch
*Attorney, Agent, or Firm*—Becker & Becker, Inc.

[57] ABSTRACT

A heater mechanism that includes a combustion chamber that is heated by open flames of a combustion gas generated from solid, liquid, or gaseous fuel, with heat being transferred from the combustion chamber to a heat-carrier that, for indirect or direct transfer of heat to a room that is to be heated, is conveyed via at least one flow-producing mechanism, which is driven by an electric motor that is supplied with power obtained from at least one thermoelectric generator directly from the heat generated by the flame in the combustion chamber. This generator is embodied as a plate-like semiconductor element having a cold side and a side that is to be heated. The cold side is disposed in the inlet region for still-cool heat-carrier, or in the vicinity of the ambient air. The side that is to be heated is disposed either in the convection range of the flame of the combustion chamber, or in the exhaust gas stream from the latter.

10 Claims, 2 Drawing Sheets

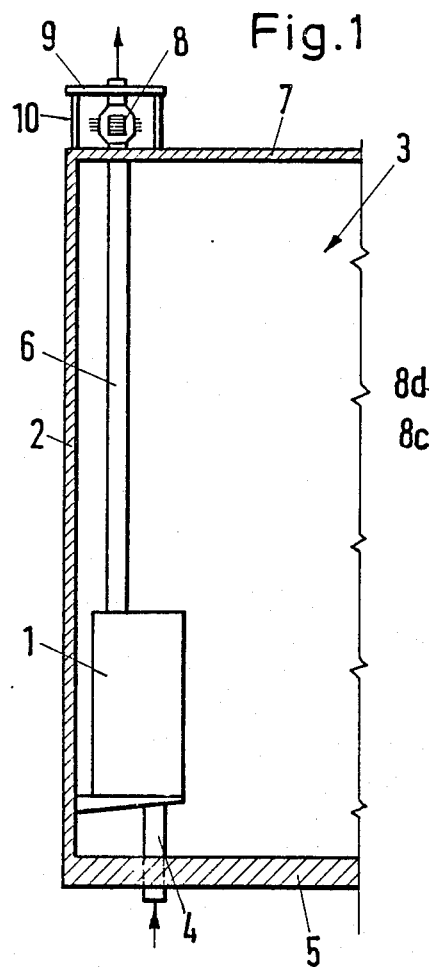
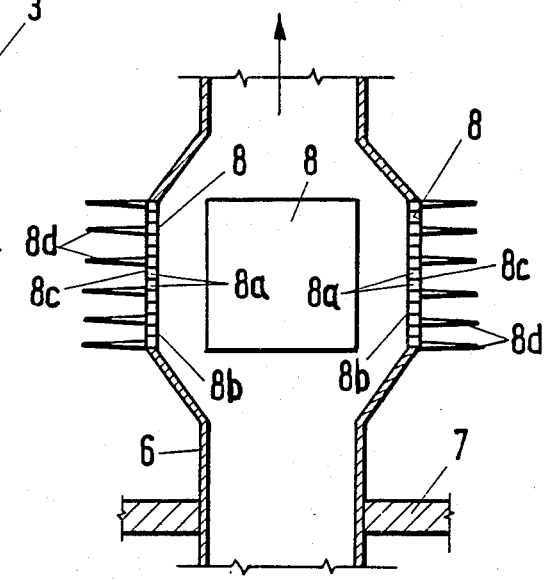
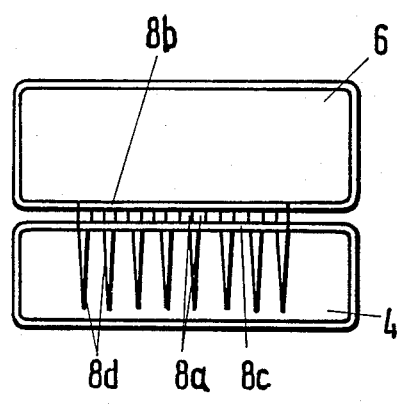
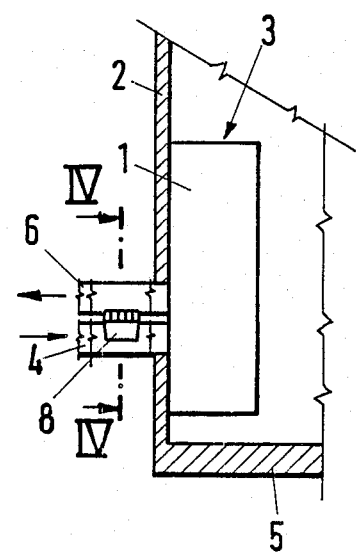

HEATER MECHANISM WITH THERMOELECTRIC POWER GENERATOR

BACKGROUND OF THE INVENTION

The present invention relates to a heater mechanism, especially for vehicles, such as vans, buses, trailers, mobile homes, and boats, and for so-called weekend houses. The mechanism includes a closed combustion chamber that is heated by open flames of a combustion gas generated from solid, liquid, or gaseous fuel. Heat is transferred from the combustion chamber to a heat-carrier that is disposed in a heating chamber that surrounds the combustion chamber. For indirect or direct transfer of heat to a room that is to be heated, the heat carrier is conveyed via at least one flowproducing mechanism, which is driven by an electric motor that is supplied with power that is obtained via at least one thermoelectric generator from the heat generated by the flame in the combustion chamber.

Heater mechanisms of the aforementioned general type are known from German Patent No. 3 148 162. These heater mechanisms have the advantage of not having to be dependent upon an additional power source, such as a battery, in order to drive the electric motor of the flow-producing mechanism during operation of the heater mechanism. If the heater mechanism is designed to heat air in the heating chamber from the combustion chamber, and to convey this hot air directly into the room that is to be heated, the flow-producing mechanism is a fan or similar blower. On the other hand, if the heater mechanism is designed for a heat carrier, preferably water, that is circulated in a closed system, and the heat of which is transferred to the air of a room via a heat exchanger that is disposed in the room, the flow-producing mechanism is a pump that circulates the liquid heat carrier between the heating chamber and the heat exchangers. In this case, heat is transferred indirectly from the combustion chamber to the room that is to be heated up.

Independently of the configuration of the heater mechanism and the type of heat carrier, it has been discovered that the thermoelectric generators, which operate pursuant to the Seebeck effect, generate very little electrical power, so that a large number of such generators are needed in order to produce the power required for driving the flow-producing mechanism. During the course of further development of semiconductor technology, thermoelectric generators in the form of platelike semiconductor elements have been produced that have a considerably greater efficiency. However, the drawback of these plate-like semiconductor elements is that their maximum operating temperature is considerably less than that of the heretofore known thermoelectric generators.

It is therefore an object of the present invention to improve a heater mechanism of the aforementioned general type in such a way that it is suitable for use with plate-like semiconductor elements as thermoelectric generators while at the same time protecting the semiconductor elements from overheating, and also improving cooling of the cold side.

BRIEF DESCRIPTION OF THE DRAWINGS

This object, and other objects and advantages of the present invention, will appear more clearly from the following specification in conjunction with the accompanying schematic drawings, in which:

FIG. 1 is a view that shows a first exemplary embodiment of the inventive heater mechanism, with an upwardly directed exhaust gas channel, and with the semiconductor elements being disposed externally of the room that is to be heated;

FIG. 2 is an enlarged, vertical, cross-sectional view through the arrangement of the semiconductor elements;

FIG. 3 is a cross-sectional view through a second exemplary embodiment of the inventive heater mechanism, with a laterally disposed exhaust gas channel, and parallel thereto, an intake channel;

FIG. 4 is an enlarged view taken along the line IV—IV in FIG. 3 through the parallel intake and exhaust gas channels;

SUMMARY OF THE INVENTION

Figure 5:
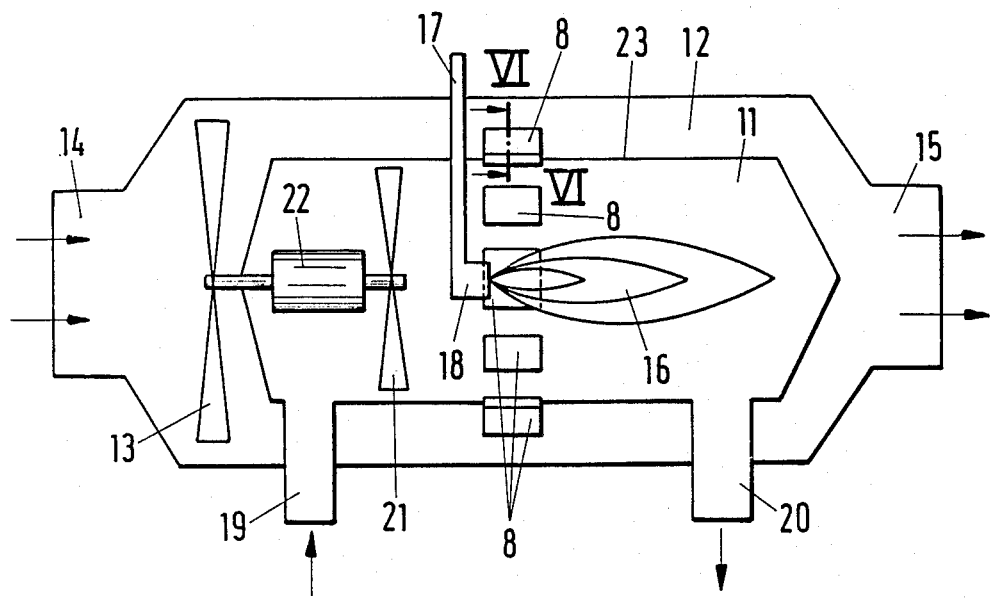
FIG. 5 is a longitudinal view through a third exemplary embodiment of the inventive heater mechanism.

Pursuant to a first embodiment of the present invention, the heater mechanism is characterized primarily in that the thermoelectric generator is embodied as a plate-like semiconductor element and is disposed in the exhaust gas channel of the combustion chamber in such a way that that side of the element that is to be heated is disposed in the exhaust gas stream, and the cold side of the element is disposed in the vicinity of the ambient air.

This inventive further development or improvement of the known heater mechanism provides the possibility of arranging any number of plate-like semiconductor elements in such a way that on the one hand, as soon as the heater mechanism has been started up, the elements supply the power that is necessary for operating the electric motor, and on the other hand, the elements have a high efficiency due to the constant cooling of their cold side. In this connection, the position of the semiconductor elements in the exhaust gas channel assures that no overheating occurs, while at the same time a reliable cooling of the cold side of the semiconductor elements via the ambient air leads to a good efficiency. In addition, the inventive heater mechanism offers the advantage of an automatic regulation, since the output of the thermoelectric generator is a function of the temperature of the ambient air. As the outside temperature decreases, the temperature difference at the semiconductor element increases, as a result of which more power is available for the operation of the electric motor, thus increasing the transfer of heat to the room that is to be heated.

Pursuant to one preferred configuration of this embodiment, a ring or wreat comprising a plurality of plate-like semiconductor elements is disposed in the exhaust gas channel externally of the room that is to be heated. This proposal results in a particularly straightforward and effective arrangement of the semiconductor elements, while at the same time providing good accessibility. The semiconductor elements are preferably protected from solar radiation by a cover plate. Pursuant to the present invention, the semiconductor elements are furthermore provided with cooling fins, and are protected against damage by a grate.

Pursuant to an alternative configuration of this embodiment, an intake channel for the air for combustion is disposed parallel to the exhaust gas channel, with the cold side of the semiconductor element, which cold side is preferably provided with cooling fins, being disposed in the intake channel. This configuration results in a particularly reliable cooling, and allows the semiconductor elements to be accommodated in a protected manner.

Pursuant to a second specific embodiment of the present invention, the heater mechanism is characterized primarily in that the thermoelectrical generator is embodied as a plate like semiconductor element, and is disposed in a partition between the combustion chamber and the heating chamber in such a way that that side of the semiconductor element that is to be heated up is disposed in the convection range of flames of the combustion chamber, and the cold side of the semiconductor element is disposed in an inlet region in the heating chamber for still-cool heat-carrier that is to be heated up by transfer of heat from the combustion chamber.

Also this inventive improvement of the known heater mechanism provides the possibility for arranging any number of plate-like semiconductor elements in such a way that on the one hand, as soon as the heater mechanism is started up, the semiconductor elements deliver the power that is needed for operating the electric motor, and on the other hand, the semiconductor elements have a high efficiency due to the constant cooling of their cold side. The position of the semiconductor elements in the inlet region of the heating chamber for the heat-carrier assures a constant cooling of the cold side of the elements, whereas that side of the semiconductor elements that are to be heated and are disposed in the convection range of the flames are assured that no overheating occurs, as would be the case if that side of the semiconductor elements that are to be heated were disposed in a region of the combustion chamber that is contacted by hot exhaust gases.

Pursuant to one preferred configuration of this embodiment, a ring or wreath comprising a plurality of plate-like semiconductor elements is disposed in the plane of the burner nozzles and in the partition between the combustion chamber and the heating chamber. This proposal results in a particularly straightforward and effective arrangement of the semiconductor elements while at the same time providing good accessibility.

In order to provide a particularly economical construction, it is furthermore advantageous to use the electric motor to drive not only the flowproducing mechanism for the heat-carrier, but also the fan or fan wheel for the air for combustion.

Further specific features of the present invention will be described in detail subsequently.

DESCRIPTION OF PREFERRED EMBODIMENTS

Referring now to the drawings in detail, the embodiments illustrated in FIGS. 1-4 schematically illustrate a heating unit 1, such as a combustion chamber, that is disposed on the inside of a wall 2 of a room 3 that is to be heated.

In the first embodiment illustrated in FIGS. 1 and 2, air for combustion is supplied to the heating unit 1 via an intake channel 4 that extends through the bottom 5 of the room or chamber 3. In contrast, the exhaust gas channel 6 is conveyed upwardly through the roof 7.

As can be seen in particular from FIG. 2, a plurality of semiconductor elements 8 are disposed in that part of the exhaust gas channel 6 that projects beyond the roof 7. Each semiconductor element 8 comprises a plurality of cubes 8a of thermoelectric semiconducting material. The cubes 8a are disposed between two plates 8b and 8c, preferably of aluminum, and represent thermoelectrical generators. The plate 8b has a smooth outer surface, and forms that side of the semiconductor element 8 that is to be heated. The plate 8c represents the cold side of this semiconductor element 8, and is provided with cooling fins 8d in order to provide a better cooling effect. Since these cooling fins 8d constantly come into contact with the cool ambient air, these fins effect a reliable cooling of the plates 8c of the semiconductor elements 8, the plates 8b of which are to be heated and are contacted by the hot stream of exhaust gas. In order to protect the cooling fins 8d and the plates 8c of the semiconductor elements 8 from solar radiation, the fins 8d and plates 8c are protected by a cover plate 9. In the embodiment illustraed in FIG. 1, the semiconductor elements 8, which are disposed in a ring-like or wreath-like manner, are furthermore protected against damage by a grate 10.

In the second embodiment illustrated in FIGS. 3 and 4, the exhaust gas channel 6 extends horizontally through the wall 2. In this embodiment, the intake channel 4 for the air for combustion is disposed parallel to the exhaust gas channel 6, and in particular is spaced slightly from the channel 6, so that the cold side (plate 8c) of the semiconductor elements 8 are disposed in the intake channel 4, whereas that side (plate 8b) that is to be heated is disposed in the exhaust gas channel 6. Also with this embodiment, the plates 8c of the semiconductor elements 8 are provided with cooling fins 8d, as can be seen particularly clearly from FIG. 4.

This embodiment also provides a good cooling of the plates 8c by the ambient air that is drawn in through the intake channel 4 for the combustion. The plates 8b of the semiconductor elements 8 disposed in the exhaust gas channel 6, in contrast, are heated by the exhaust gas stream, in which connection there is assured that no overheating of the semiconductor elements 8 occurs.

Figure 6:
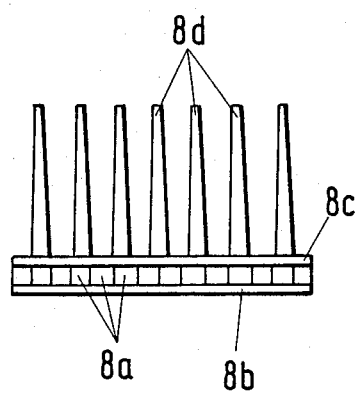
FIG. 6 is a view taken along the line VI—VI in FIG. 5 through one of the semiconductor elements.

The embodiment illustrated in FIGS. 5 and 6 is designed for heating air, and includes a closed combustion chamber 11 that is surrounded by a heating chamber 12 for the heat-carrier, which in this embodiment is air. This air is drawn in through an intake connector 14 via a fan 13, is conveyed through the heating chamber 12, and is supplied via a connector 15 for hot air to the room or compartment that is to be heated, or to a conduit system that leads to this room.

The combustion chamber 11 is heated by a flame 16 that results from the combustion of, in this embodiment, liquid or gaseous fuel, accompanied by the supply of combustion air. A fuel line 17 and a jet or burner nozzle 18 are shown in FIG. 5. The air that is necessary for combustion is drawn into the combustion chamber 11 via a connector 19 for air for combustion. The exhaust gas is withdrawn from the combustion chamber 11 via a connector 20 for exhaust gas. The intake of the air for combustion, and the withdrawal of the exhaust gas, are enhanced by a fan wheel 21 that, together with the fan 13, is driven by an electric motor 22.

This electric motor 22 is supplied with power from a plurality of semiconductor elements 8, one of which is shown in FIG. 6. Just as with the previous embodiments, each semiconductor element 8 comprises a large number of cubes 8a of thermoelectric semiconducting material. These cubes 8a are disposed between the two plates 8b and 8c, which are preferably made of aluminum. The plate 8b has a smooth outer surface, and forms that side of the semiconductor element 8 that is to be heated. The plate 8c represents the cold side of the semiconductor element 8, and is provided with cooling fins 8d in order to provide a better cooling effect.

As can be seen from FIG. 5, the semiconductor elements 8 are disposed in the manner of a wreath in the plane of the burner nozzle 18 and in the partition 23 that is disposed between the combustion chamber 11 and the heating chamber 12. The plates 8b form that side of the semiconductor elements 8 that is to be heated, and are accordingly disposed in the radiation or convection range of the flame 16 without there being any danger that the plates 8b will be contacted by the hot exhaust gases of the flame 16. The plates 8c, which form the cold side of the semiconductor elements 8, and are provided with cooling fins 8d, in contrast, are disposed in a region of the heating chamber 12 where the heat carrier, in this embodiment air, that is to be heated by the heat from the combustion chamber 11 has just entered the heating chamber 12. At this location, the air is consequently still cool enough in order to cool the plates 8c of the semiconductor elements 8, with the cooling effect being enhanced by the cooling fins 8d. Thus, the position of the semiconductor elements 8 reliably prevents an overheating of the plates 8b, and at the same time assures an adequate cooling of the plates 8c, thereby resulting in a high efficiency of the semiconductor elements 8.

In the event that the temperature difference betwenn the heated-up side and the cold side of the semiconductor elements 8 is not great enough, the cold side can be forcibly cooled. This can be effected either by air, or by a coolant that is circulated in a closed circuit. An electric motor either drives a fan, preferably an axial-flow fan, or a coolant pump. The power required for this electric motor is generated by the semiconductor elements 8, with this small amount of electric current being made available as a priority since after the cooling effect occurs it considerably improves the efficiency of the semiconductor elements 8, and hence of the current generation thereof.

The present invention is, of course, in no way restricted to the specific disclosure of the specification and drawings, but also encompasses any modifications within the scope of the appended claims.

What we claim is:

1. In a heater mechanism for vehicles, boats, and weekend houses, with said mechanism including a closed combustion chamber that is heated by open flames of a combustion gas generated from solid, liquid, or gaseous fuel, whereby heat is transferred from said combustion chamber to a heat-carrier that is located in a heating chamber that surrounds said combustion chamber, with said heat-carrier, for indirect or direct transfer of heat to a room that is to be heated, being conveyed via at least one flow-producing mechanism, which is driven by an electric motor that is supplied with power that is obtained via at least on thermoelectric generator from the heat generated by the flame in said combustion chamber, the improvement wherein:
    said at least one theroelectric generator is embodied as a plate-like semiconductor element having a cold side and a side that is to be heated, with this latter side receiving heat generated in said combustion chamber, and
    a partition disposed between said combustion chamber and said heating chamber, with said at least one semiconductor element being disposed in said partition in such a way that said side of said element that is to be heated is disposed in the convection range of flames of said combustion chamber, and said cold side of said semiconductor element is disposed in an inlet region in said heating chamber for still-cool heat-carrier that is to be heated by the transfer of heat from said combustion chamber.

2. A heater mechanism according to claim 1, which includes a wreath composed of a plurality of said plate-like semiconductor elements; and which includes burner nozzles for said combustion chamber, with said wreath being disposed in said partition in a plane of said burner nozzles.

3. In a heater mechanism for vehicles, boats, and weekend houses, with said mechanism including a closed combustion chamber that is heated by open flames of a combustion gas generated from solid, liquid, or gaseous fuel, whereby heat is transferred from said combustion chamber to a heat-carrier that is located in a heating chamber that surrounds said combustion chamber, with said heat-carrier, for indirect of direct transfer of heat to a room that is to be heated, being conveyed via at least one flow-producing mechanism, which is driven by an electric motor that is supplied with power that is obtained via at least one thermoelectric generator from the heat generated by the flame in said combustion chamber, the improvement wherein:
    said at least one thermoelectric generator is embodied as a plate-like semiconductor element having a cold side and a side that is to be heated, with this layer side receiving heat generated in said combustion chamber,
    an exhaust gas channel that leads from said combustion chamber, with said at least one semiconductor element being disposed in said exhaust gas channel in such a way that said side of said element that is to be heated is disposed in a stream of exhaust gas, and said cold side of said semiconductor element is adapted to be in contact with ambient air, and
    a wreath composed of a plurality of said plate-like semiconductor elements, with said wreath being disposed in said exhaust gas channel externally of said room that is to be heated.

4. In a heater mechanism for vehicles, boats, and weekend houses, with said mechanism including a closed combustion chamber that is heated by open flames of a combustion gas generated from solid, liquid, or gaseous fuel, whereby heat is transferred from said combustion chamber to a heat-carrier that is located in a heating chamber that surrounds said combustion chamber, with said heat-carrier, for indirect or direct transfer of heat to a room that is to be heated, being conveyed via at least one flow-producing mechanism, which is driven by an electric motor that is supplied with power that is obtained via at least one thermoelectric generator from the heat generated by the flame in said combustion chamber, the improvement wherein:
    said at least one thermoelectric generator is embodied as a plate-like semiconductor element having a cold side and a side that is to be heated, with this latter side receiving heat generated in said combustion chamber,
    an exhaust gas channel that leads from said combustion chamber, with said at least one semiconductor element being disposed in said exhaust gas channel in such a way that said side of said element that is to be heated is disposed in a stream of exhaust gas, and said cold side of said semiconductor element is adapted to be in contact with ambient air, and a cover plate for protecting said semiconductor elements from solar radiation.

5. A heater mechanism according to claim 4, in which said semiconductor elements are provided with cooling fins; and which includes a grate to protect said elements from damage.

6. In a heater mechanism for vehicles, boats, and weekend houses, with said mechanism including a closed combustion chamber that is heated by open flame of a combustion gas generated from solid, liquid, or gaseous fuel, whereby heat is transferred from said combustion chamber to a heat-carrier that is located in a heating chamber tat surrounds said combustion chamber, with said heat-carrier, for indirect or direct transfer of heat to a room that is to be heated, being conveyed via at least one flow-producing mechanism, which is driven by an electric motor that is supplied with power that is obtained via at least one thermoelectric generator from the heat generated by the flame in said combustion chamber, the improvement wherein:

said at least one thermoelectric generator is embodied as a plate-like semiconductor having a cold side and a side that is to be heated, with this latter side receiving heat generated in said combustion chamber, an exhaust gas channel that leads from said combustion chamber, with said at least one semiconductor element being disposed in said exhaust gas channel in such a way that said side of said element that is to be heated is disposed in a stream of exhaust gas, and said cold side of said semiconductor element is adapted to be in contact with ambient air, and an intake channel for air for combustion extends parallel to said exhaust gas channel and leads to said combustion chamber, with said cold side of said semiconductor element being disposed in said intake channel.

7. A heater mechanism according to claim 6, in which said cold side of said semiconductor element is provided with cooling fins that extend into said intake channel.

8. A heater mechanism according to claim 1, which includes a fan wheel for conveying air for combustion to said combustion chamber, with said electric motor driving not only said flow-producing mechanism for said heat-carrier, but also said fan wheel.

9. A heater mechanism according to claim 4, which includes means for forcibly cooling said cold side of said semiconductor elements.

10. A heater mechanism according to claim 9, in which said means for forcibly cooling said cold side of said semiconductor element includes electric motor means to move air, or coolant circulated in a closed circuit, with power for said electric motor means being generated by said semiconductor elements.

* * * * *